US012641112B2

(12) United States Patent
Nabeel et al.

(10) Patent No.: US 12,641,112 B2
(45) Date of Patent: May 26, 2026

(54) PROACTIVELY DETECTING MALICIOUS DOMAINS USING GRAPH REPRESENTATION LEARNING

(71) Applicant: Qatar Foundation for Education, Science and Community Development, Doha (QA)

(72) Inventors: Mohamed Nabeel, Doha (QA); Issa Khalil, Doha (QA); Ting Yu, Doha (QA); Fatih Deniz, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 171 days.

(21) Appl. No.: 18/617,133

(22) Filed: Mar. 26, 2024

(65) Prior Publication Data

US 2024/0333749 A1 Oct. 3, 2024

Related U.S. Application Data

(60) Provisional application No. 63/492,395, filed on Mar. 27, 2023.

(51) Int. Cl.
*H04L 9/40* (2022.01)
*H04L 41/16* (2022.01)

(52) U.S. Cl.
CPC .......... *H04L 63/1433* (2013.01); *H04L 41/16* (2013.01); *H04L 63/145* (2013.01)

(58) Field of Classification Search
CPC .... G06F 16/951; G06F 21/566; G06F 21/552; G06F 21/577; G06F 16/90344;

(Continued)

(56) References Cited

U.S. PATENT DOCUMENTS 9,762,612 B1 * 9/2017 Schiffman ........... H04L 41/0631
10,075,417 B2 * 9/2018 Baughman .......... H04L 63/1441
(Continued)

FOREIGN PATENT DOCUMENTS

| CN | 112910929 A | 6/2021 | |
| WO | WO-2017031505 A2 * | 2/2017 | ........... G06F 16/951 |
| WO | WO-2020237613 A1 * | 12/2020 | .......... G06F 11/0787 |

OTHER PUBLICATIONS

Eshete, et al.; "Malicious Website Detection: Effectiveness and Efficiency Issues"; 2011; IEEE; (4 pages).

(Continued)

*Primary Examiner* — Kyung H Shin
(74) *Attorney, Agent, or Firm* — K&L Gates LLP

(57) ABSTRACT

Proactively detecting malicious domains using graph representation learning may be provided by extracting seed domains from a uniform resource locator (URL) feed of observed requests for access to domains; expanding the seed domains to a via a passive domain name service (PDNS) crawl to include additional domains with the seed domains; collecting a ground truth, including labeling a first set of the seed domains as benign and a second set of the seed domains as malicious; constructing a graph neural network (GNN) of the additional domains and the seed domains, wherein each domain of the additional domains and the seed domains are represented as a node in the GNN that includes feature values associated that domain; training the GNN to classify unseen domains not associated with a node as either benign or malicious; and classifying, via the GNN, a queried domain as either benign or malicious.

20 Claims, 9 Drawing Sheets

(58) Field of Classification Search

CPC ............. G06F 11/0787; G06F 11/0727; H04L 63/1483; H04L 63/1416; H04L 63/0245; H04L 63/1425; H04L 63/145; H04L 63/1441; H04L 63/0227; H04L 63/1466; H04L 63/101; H04L 61/4511; H04L 63/0236; H04L 63/0263; H04L 63/1408; H04L 63/20; H04L 63/1433; H04L 41/0631; H04L 61/10; H04L 65/10; H04L 61/301; H04L 41/16; G06N 99/00; G06N 20/00; G06N 20/20; G06N 5/01; G06N 3/088; G06N 20/10; G06N 3/084; H04W 12/67; G06Q 10/20

See application file for complete search history.

(56) References Cited

U.S. PATENT DOCUMENTS

| | | | | |
|---|---|---|---|---|
| 11,843,622 | B1 * | 12/2023 | Tellez | ................. H04L 63/1425 |
| 2018/0069883 | A1 * | 3/2018 | Meshi | ................. H04L 63/1425 |

| | | | | |
|---|---|---|---|---|
| 2018/0293381 | A1 * | 10/2018 | Tseng | ................... G06F 21/566 |
| 2022/0103592 | A1 * | 3/2022 | Semel | ................. H04L 63/1408 |
| 2023/0112092 | A1 * | 4/2023 | Tymchenko | .......... H04L 63/101 726/23 |
| 2023/0254338 | A1 * | 8/2023 | Melicher | ............... G06F 16/951 726/13 |
| 2023/0362176 | A1 * | 11/2023 | Jiang | ................... H04L 63/1425 |
| 2024/0039890 | A1 * | 2/2024 | Szurdi | ................. H04L 63/0263 |
| 2024/0046107 | A1 * | 2/2024 | Chi | ........................ G06N 3/088 |

OTHER PUBLICATIONS

Zhou, et al.; "Graph neural networks: A review of methods and applications"; ScienceDirect; 2020; (25 pages).

Hao, et al.; "PREDATOR: Proactive Recognition and Elimination of Domain Abuse at Time-Of-Registration"; Oct. 2016; ACM Digital Library; (12 pages).

* cited by examiner

200

PROACTIVELY DETECTING MALICIOUS DOMAINS USING GRAPH REPRESENTATION LEARNING

CROSS-REFERENCES TO RELATED APPLICATIONS

The present disclosure claims the benefit of U.S. Provisional Patent Application No. 63/492,395 entitled "METHODS AND TECHNIQUES TO PROACTIVELY DETECT MALICIOUS DOMAINS USING GRAPH REPRESENTATION LEARNING" and filed on Mar. 27, 2023, which is incorporated herein by reference in its entirety.

BACKGROUND

Attackers increasingly use disposable domains as the primary vector to launch cyber-attacks. To prevent these cyber-attacks, numerous defense solutions have been developed. However, existing detection mechanisms are either too late to catch such malicious domains due to limited information and short life spans or are unable to catch them due to evasive techniques, including cloaking and CAPTCHA.

SUMMARY

The present disclosure generally relates to systems, methods, and devices for detecting malicious domains.

In light of the present disclosure, and without limiting the scope of the disclosure in any way, in an aspect of the present disclosure, which may be combined with any other aspect listed herein unless specified otherwise, a method for predicting malicious domains is provided.

In an aspect of the present disclosure, which may be combined with any other aspect listed herein unless specified otherwise, a method for predicting malicious domains in a neighborhood of seed malicious domains using a semi-supervised graph neural network includes (1) constructing a semi-supervised graph neural network, and (2) training the semi-supervised graph neural network using five-fold cross-validation.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure generally relates to systems, methods, and devices for detecting malicious domains. The present disclosure provides a content-agnostic approach of detecting malicious domains early in their life-cycle We observe that attackers often reuse hosting infrastructures to launch multiple malicious domains due to increased utilization of automation and economies of scale. Thus, it gives defenders the opportunities to monitor such infrastructure to identify newly hosted malicious domains. However, such infrastructures are often shared hosting environments where benign domains are also hosted, which could result in prohibitive number of false positives. Therefore, one needs innovative mechanisms to better distinguish malicious domains from the benign ones even when they share hosting infrastructures.

The present disclosure provides systems and methods that offer real-time predictions and batched blocklist updates/ generation that can be used in various cybersecurity fields and networking concern for improving system reliability, reducing the severity of external threats, and reducing the odds of breach by an external party among other benefits including reduced computational resource usage for greater benefits compared to traditional approaches.

Figure 1:
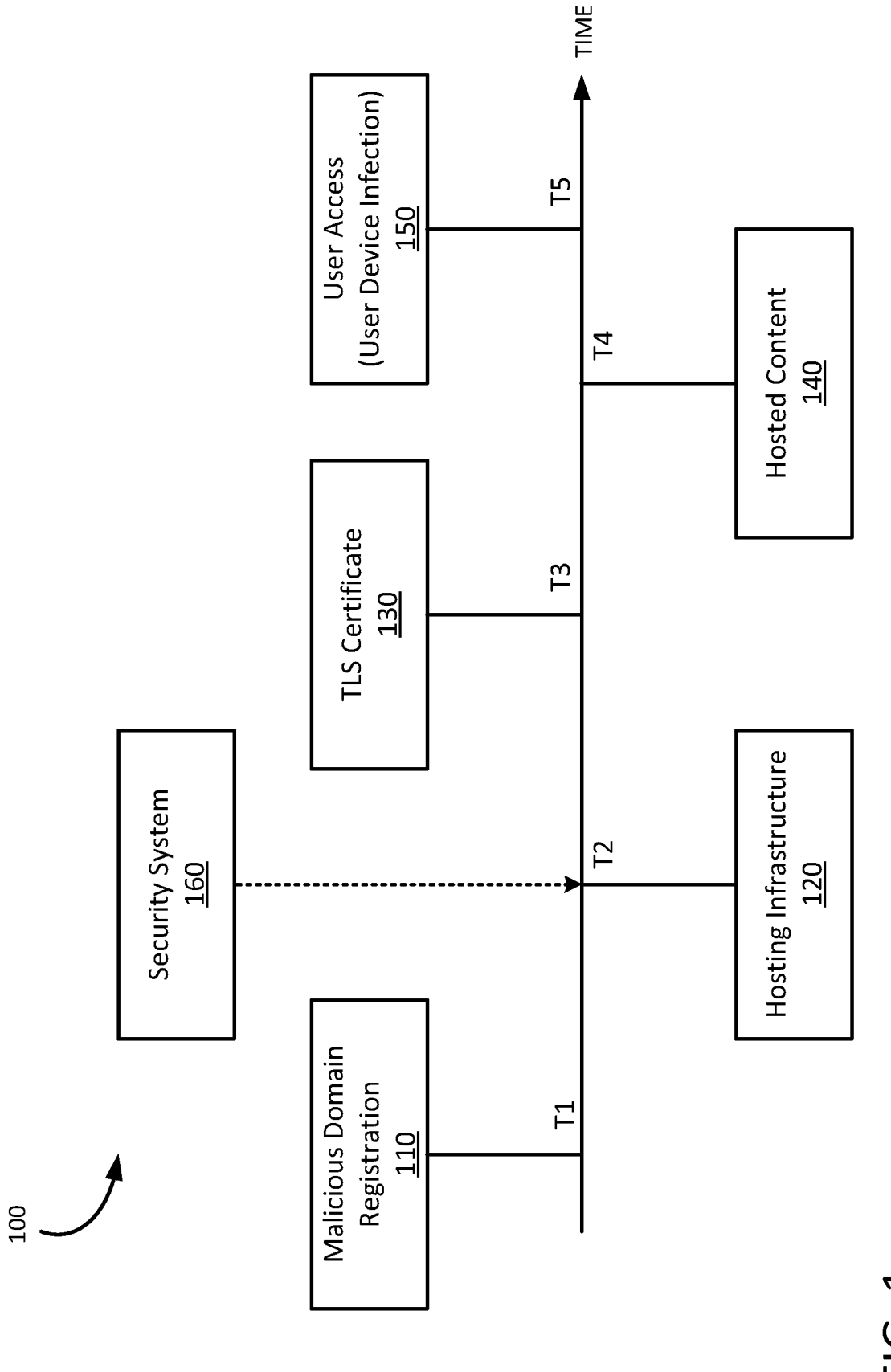
FIG. 1 illustrates an example infection pathway in which the present application may be applied to improve the functionality of the computing systems therein.

FIG. 1 illustrates an example infection pathway 100 in which the present application may be applied to improve the functionality of the computing systems therein. As illustrated, a malicious domain registration 110 occurs at a first time, and is made available via hosting infrastructure 120 at a second time, is issued a TLS certificate 130 at a third time, provided with host content 140 at a fourth time, and accessed by a user device 150, thereby compromising or infecting the user device 150, at a fifth time. \ Each of the computing devices used in the pathway 100 may be understood with reference to the computing device 900 discussed in relation to FIG. 9.

There are a plethora of traditional and proposed solutions to detect malicious domains. While these traditional solutions assist in detecting many malicious domains, many others either go undetected or get detected only after users are compromised. A key reason is that most existing security scanners rely on host content 140 to detect malicious domains after the malicious content reaches a security enforcement point (e.g., a Firewall, a browser). While content-based detection techniques are important, such approaches have a blind spot for cloaked webpages (which is a technique attackers increasingly use), require a large amount of computational resources to analyze billions of webpage contents; and by the time malicious webpage contents are available, it is difficult, if not impossible, to prevent the attack from happening. As shown in FIG. 1, the security system 160 of the present disclosure is applied at the level of hosting infrastructure 120 detect malicious domains much earlier in the pathway 100 at the time of hosting, which contrasts with traditional techniques that are applied with available host content 140.

The security system 160 differentiates malicious domains from benign domains with much less available information than content-based approaches. A key observation is that while the toxicity, (e.g., the ratio of malicious domains to all domains), of hosting infrastructures on the Internet, in general, is very low, the same measure in the neighborhoods that previously hosted malicious domains is relatively high. Stated differently, once a given host has been found to host a malicious domain, the given domain can be assumed (and in practice found) to be more likely to host malicious domains again in the near future. For example, the toxicity of a sample of domains observed from passive DNS on 2022 Jul. 1 is 0.002 whereas the toxicity of a sample of domains around the IPs previously hosting malicious domains on the same day is 0.063 (31.5 times higher).

Due to the increased automation and economies of scale, attackers reuse hosting infrastructure to launch attacks. By monitoring new domains hosted on the internet protocol addresses and domain hosts that recently hosted malicious domains, it would seem intuitive that one can identify new malicious domains. However, due to the increasing use of shared hosting, and the overall low ratio of toxicity, not all new domains hosted in a toxic infrastructure are malicious. In other words, being hosted on a malicious infrastructure is not conclusive evidence of the maliciousness of the domain. Therefore, additional innovative mechanisms are required to identify true malicious domains from false positives sharing the same hosting infrastructures.

Further, a malicious domain could be compromised itself, such as when a benign domain is exploited by the attacker, or an attacker-created or otherwise registered by the attacker. Because compromised domains are originally benign, compromised domains tend to be hosted on infrastructures where many other benign domains are hosted. To minimize the weak associations and reduce the conflicting labels, security system 160 uses a practical rule-based approach to filter out public domains and keep attack domains. Further, for missing features in network graphs, it is often the case that all related features are missing, and, therefore, existing imputation techniques do not work as these techniques assume at least some features are available. Thus, a different approach is required to impute maliciousness.

The security system 160 is designed to support two key use cases: batch-mode blocklist generation/updates (e.g., daily/weekly blocklist generation) and real-time prediction. On a batch-mode basis, security system 160 first compiles a seed malicious domain list first seen on a given day and identifies other recent domains hosted on the same infrastructure where the seed malicious domains are hosted. Based on these resolutions, security system 160 builds a graph consisting of domains and IP addresses. Then, security system 160 collects lexical and hosting features and ground truth domains to train a machine learning model, such as a Graph Neural Networks (GNN) model. Based on the trained model, security system 160 detects a number of unseen malicious domains per batch periods. An ensemble of batch-period trained models is sued to predict in real-time the malicious domains not present in the training graph to further reduce the false positives.

GNNs are a class of deep learning models for learning from data represented as graphs. GNNs learn representations of either nodes, edges, or whole graphs. GNNs combine node feature information with the graph structure by recursively passing neural messages along the edges of the input graph. GNNs can be broadly categorized into two groups: those that work on homogeneous graphs having one type of nodes and edges and those that work on heterogeneous graphs having different node types and/or edge types. Graph Convolution Network (GCN), Graph Attention Networks (GAT), and GraphSAGE are examples of the former category whereas Relational GCN (RGCN) and HGT are examples of the latter.

In an example, a system for detecting malicious domains may identify a first set of daily malicious seed domains using the daily block listed Uniform Resource Locators (URLs). Once identified, the security system 160 may identify a second set of daily malicious domains as a portion of the first set of daily malicious seed domains. A domain of the first set may fall within the second set of daily malicious seed domains if the domain was marked as "malicious" by at least five VirusTotal (or similar) URL Feeds.

In various embodiments, to evaluate the various hosting services, the security system 160 uses various different data sources. For example, passive DNS (PDNS) 170 captures traffic by the cooperative deployment of sensors in various locations of the Domain Name Service (DNS) hierarchy. For example, Farsight PDNS data, uses sensors deployed behind DNS resolvers and provides aggregate information about domain resolutions and publicly available zone file updates. The security system 160 can use such data to extract domains related to seed malicious domains as well as various domain/IP features.

In an example data source, a consensus intelligence feed, such as the VIRUSTOTAL URL Feed (VT), provides a public querying platform to obtain URL intelligence by analyzing more than 90 third-party scanners and URL/domain blocklisting services. As a non-limiting example of a consensus intelligence feed, VT provides an Application Program Interface (API) to check the status of URLs. Additionally, VT publishes an hourly feed of URLs along with aggregated intelligence for the URLs queried by Internet users all around the world. The security system 160 can use the threshold of X (e.g., five) scanners as the cutoff to identify malicious domains, such that, if a domain is reported as malicious by X or more scanners, the domain is included in the ground truth of malicious domains.

In another example, the security system 160 can uses a popularity intelligence feed, such as the ALEXA Top 1 Million, as AMAZON ALEXA compiles the most popular 1 million domains each day. The daily popularity of a domain does not directly correlate with whether the domain is benign; however, domains consistently appearing in a popularity intelligence feed list over a period are highly likely to be benign, as attackers use a domain for a short time period and the domain popularity of these malicious domains is likely to last only a few days. Based on these observations, the security system 160 can compile a popularity intelligence feed top 30-day list, which includes the domains consistently appearing in popularity intelligence feed for the 30 day window, as one source of benign domains.

The security system 160 then executes a PDNS crawl, using the second set of daily malicious domains. The PDNS crawl is executed to further identify domains with the same IP address as the malicious domains of the second set. Because multiple malicious domains are usually hosted on the same set of IPs, there is an intrinsic association among such domains. Thus, after the PDNS crawl is executed, the security system 160 expands a graph in the neighborhood of seed malicious domains to likely discover additional, malicious domains that were not identified in step one. However, while domains having the same IP address as the malicious domains identified are more likely to also be malicious domains compared to random domains, there are still many benign domains in these neighborhoods. Therefore, there is a need for systems, methods, and devices that detect malicious domains from an identified neighborhood of a domain marked as "malicious."

Figure 2:
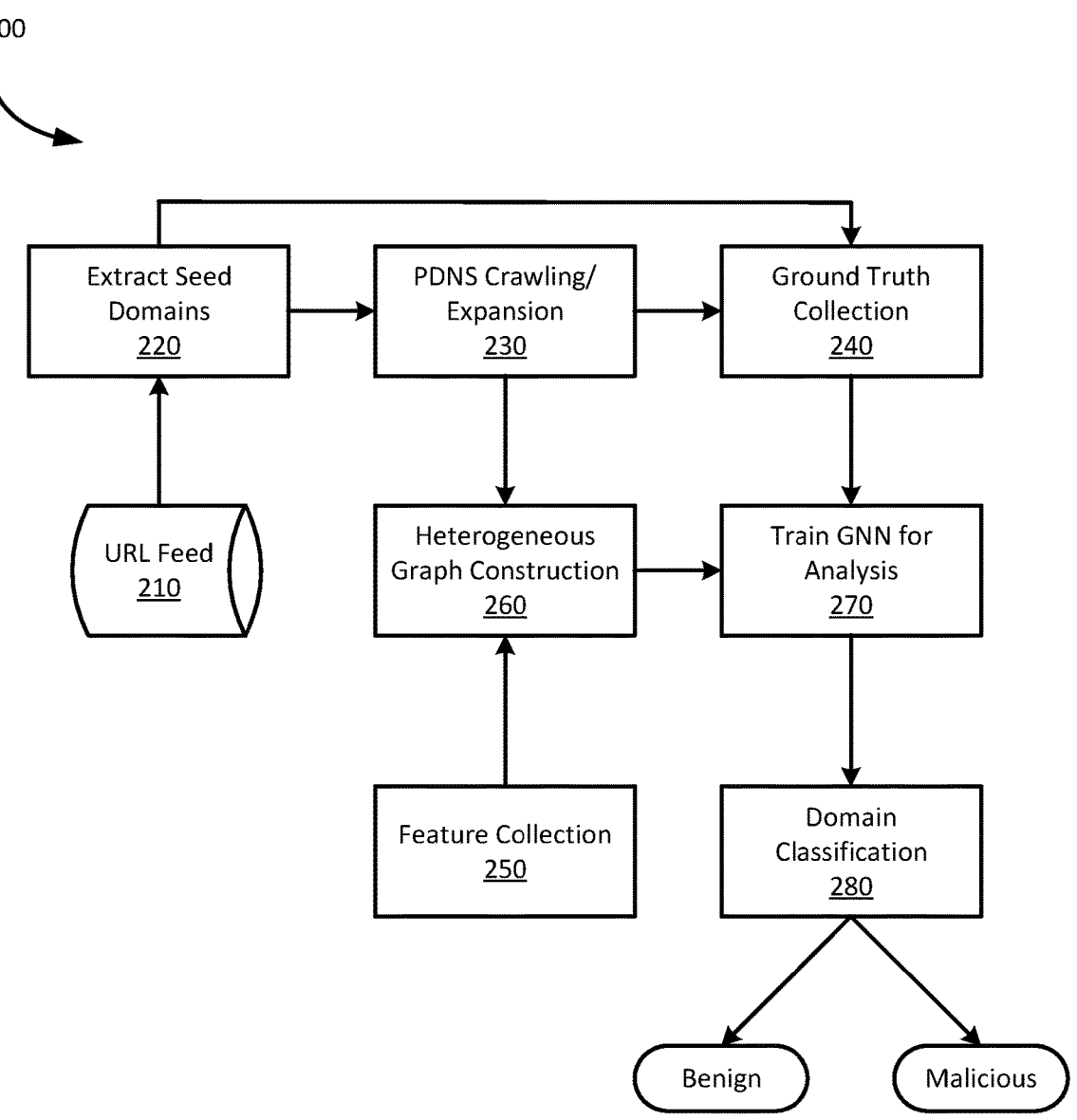
FIG. 2 is a flowchart of an example method for the overall pipeline of detecting malicious domains for a given batch period, according to embodiments of the present disclosure.

FIG. 2 is a flowchart of an example method 200 for the overall pipeline of detecting malicious domains for a given batch period (e.g., day), according to embodiments of the present disclosure.

At block 210, the security system 160 receives a URL feed for the blocklisted URLs for the batch period.

At block 220, the security system 160 extracts a set of seed domains in the batch period malicious seed domains using the daily blocklisted URLs. To extract malicious seed domains, the security system 160 starts with URLs that are marked as malicious by at least X consensus intelligence feed scanners and an active consensus intelligence feed scan of the corresponding domains with at least Y consensus intelligence feed scanners (e.g., where X>Y; such as X=5 and Y=3). The security system 160 extracts only those malicious domains that are highly likely to be created by attackers as the goal is to detect domains created by attackers as early in the domain life cycle as possible. The malicious seed extraction process is discussed in greater detail in relation to FIG. 4.

To evade detection, attackers deploy malicious domains with dynamic behavior by frequently changing the IP resolutions thereof or creating new domains. While doing so, attackers tend to reuse infrastructure resources. Further, attackers are increasingly using automation, and host malicious domains in a similar pool of IPs. Following this observation, at block 230, the security system 160 executes a PDNS crawl of recently hosted domains and expands the graph in the neighborhood of seed malicious domains to discover other likely malicious domains. While the toxicity of the neighborhood is relatively high compared to random neighborhoods, there are still many benign domains in these neighborhoods, mainly due to shared hosting on public infrastructures.

At block 260, the security system 160 constructs a heterogeneous graph based on the PDNS records. The heterogeneous graph consists of apex domains (i.e., e2LDs), fully-qualified domain names (FQDNs), IP addresses, subnets, and Autonomous System Numbers (ASNs). To supplements the nodes with various feature data, the security system 160 collects various features at block 250. These node features, include lexical features of domain names, and a set of novel hosting features for both domains and IPs, including those set forth in Table 1.

TABLE 1

| Name | Node Features Description | Type |
|---|---|---|
| Pop_keywords | Number of suspicious popular keywords such as secure, verify and signin. | Num |
| Length | Length of the domain name | Num |
| Minus | Number of minus signs in the domain name | Num |
| Suspicious_tld | Whether the TLD is a previously known TLD with a low reputation | Bool |

TABLE 1-continued

| Name | Node Features Description | Type |
|---|---|---|
| Brand_pos | Position of the brand in the domain name | Num |
| Fake_tld | Number of gTLDs (com, net, org, gov, info, edu) present within the domain name | Num |
| Query_count | Number of times the domain is accessed in the last 30 days | Num |
| #ips | Number of IPs on which the domain is hosted | Num |
| #name_servers | Number of authoritative name servers associated with the domain | Num |
| Is_ns_matching | Does the apex of the domain matches that of the name server? | Bool |
| #soa_domains | Number of start of authority domains associated with the domain | Num |
| Is_soa_matching | Does the apex of the domain matches that of the SOA domain? | Bool |
| Duration | PDNS duration of the domain (last seen-first seen) | Num |
| #apexes | Number of apex domains hosted on the IP in the last 30 days | Num |
| Query_count | Number of times all hosted domains accessed in the last 30 days | Num |
| duration | PDNS duration of the IP (last seen-first seen) | Num |

At block 240, the security system 160 collects a ground truth. For malicious ground truth, the security system 160 uses malicious seed nodes as well as additional labeled nodes generated with heuristics described with respect to FIG. 5. Traditional approaches often use a top x list or popularity feed as the benign ground truth and although those domains are likely to be benign, those domains represent a biased set of benign domains due to several reasons such as exclusion of benign domains with low web traffic. This biasing inevitably results in models with high false positives in practice. In contrast, the security system 160 uses a pragmatic approach to compile a representative benign ground truth by considering multiple sources, as is described with respect to FIG. 6.

Figure 7:
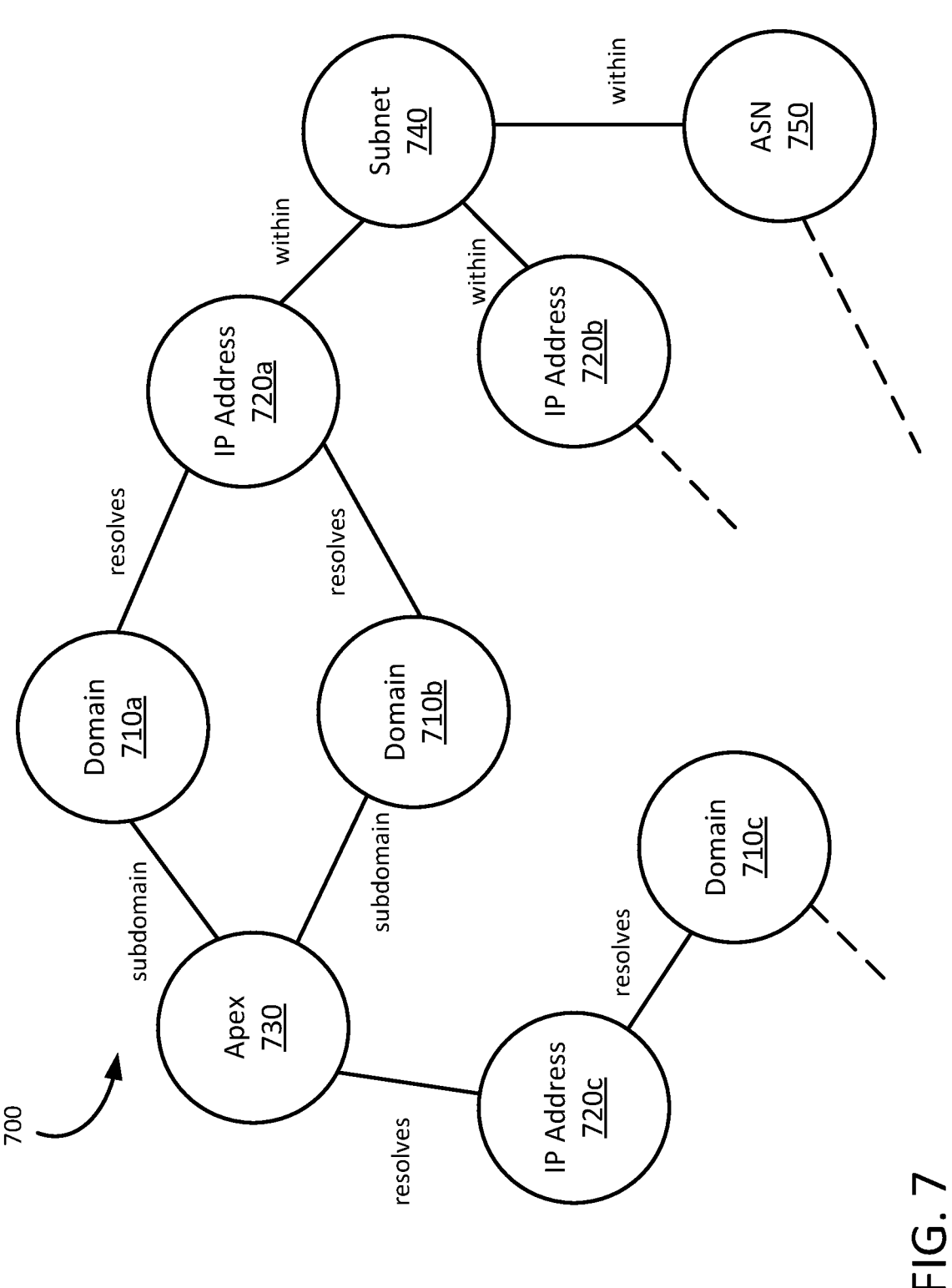
FIG. 7 illustrates an example of a graph, as may be used to proactively detect malicious domains, according to embodiments of the present disclosure.

At block 270, with the constructed heterogeneous graph and the ground truth, the security system 160 trains a semi-supervised GNN, as discussed with respect to FIG. 7 to predict unseen malicious domains in the neighborhoods of seed malicious domains.

At block 280, once the GNN is trained, then the security system 160 is able to perform domain classification into benign or malicious domains to threat detection, mitigation, and quarantining. The classified domains may be provided individually to a user in response to a query related to a particular domain or as a block list to a user to aid the user in avoiding accessing (or blocking access to or communication from) domains identified as being malicious.

Figure 3:
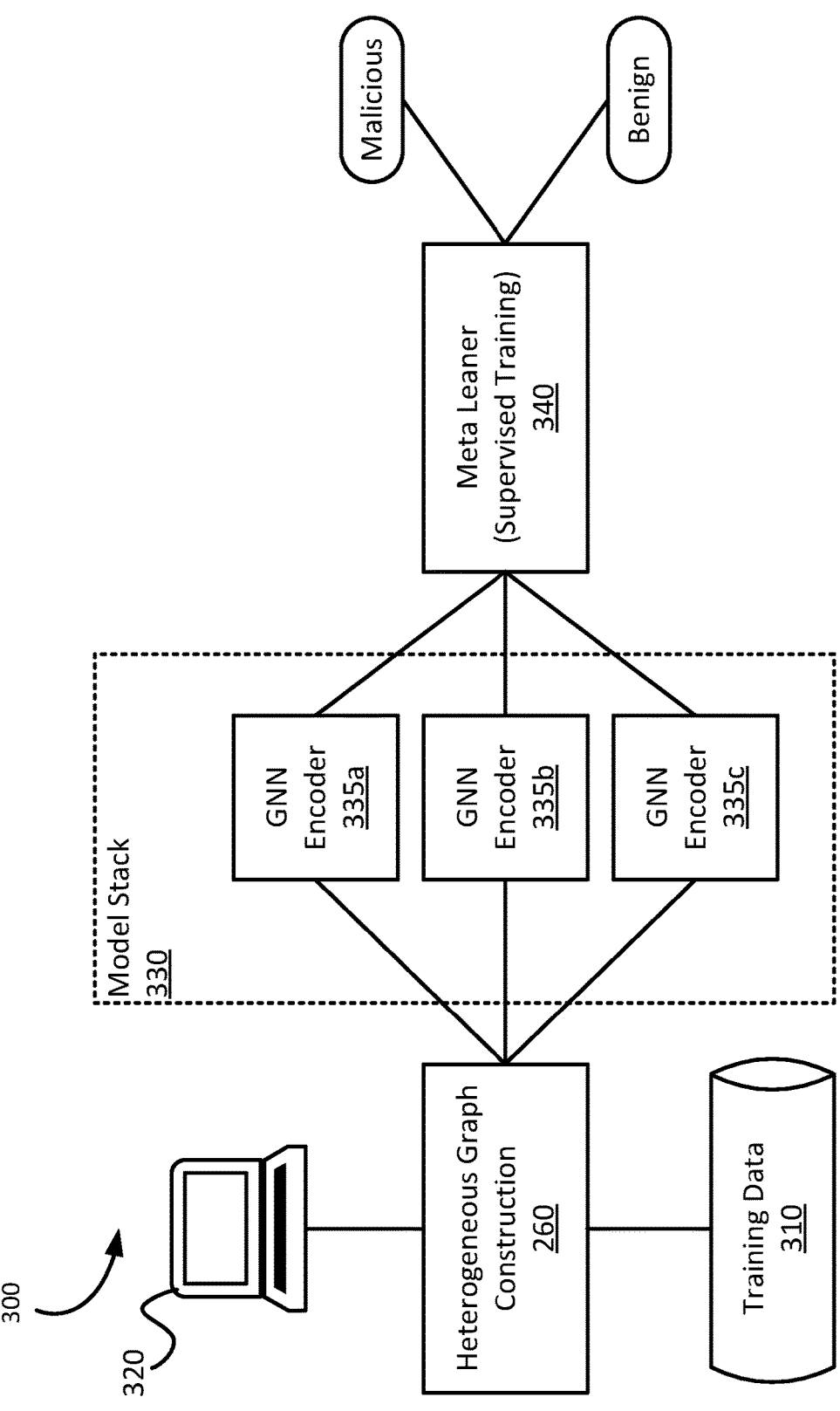
FIG. 3 illustrates how the security system is able to overcome the challenges faced by traditional systems, according to embodiments of the present disclosure.

FIG. 3 illustrates how the security system 160 is able to overcome the challenges faced by traditional systems, according to embodiments of the present disclosure. Traditional solutions are often unable to predict the maliciousness of a domain that is absent in the training dataset. Retraining a graph model is computationally expensive and is therefore it is not practical to retrain the model whenever a graph is updated. Thus, an inductive approach, which trains a model on one graph and then can apply the model to a totally different graph without retraining, is much desired in a practical system. This inductive approach allows the present security system 160 to perform real-time detection of domains unseen in the domain resolution graph in an inductive manner, The security system 160 use an ensemble classifier to further boost the classification performance of the GNN.

During construction of the graph (e.g., block 260 of method 200, discussed in regard to FIG. 2), the security system 160 uses a model stack 330 of semi-supervised GNN encoders 330*a-c* and a meta-learner 340 to fuse the embeddings from the model stack 330 to make the final classification of malicious or benign for a domain. For a new domain, the security system 160 constructs the passive DNS graph around the neighborhood of this domain (e.g., the target domain computational graph) and performs only forward passes to obtain the embeddings from these stacked models 330. Although illustrated with three GNN encoders 330, the present disclosure contemplates than any number of GNN encoders 330 may be used in the model stack 330

Figure 4:
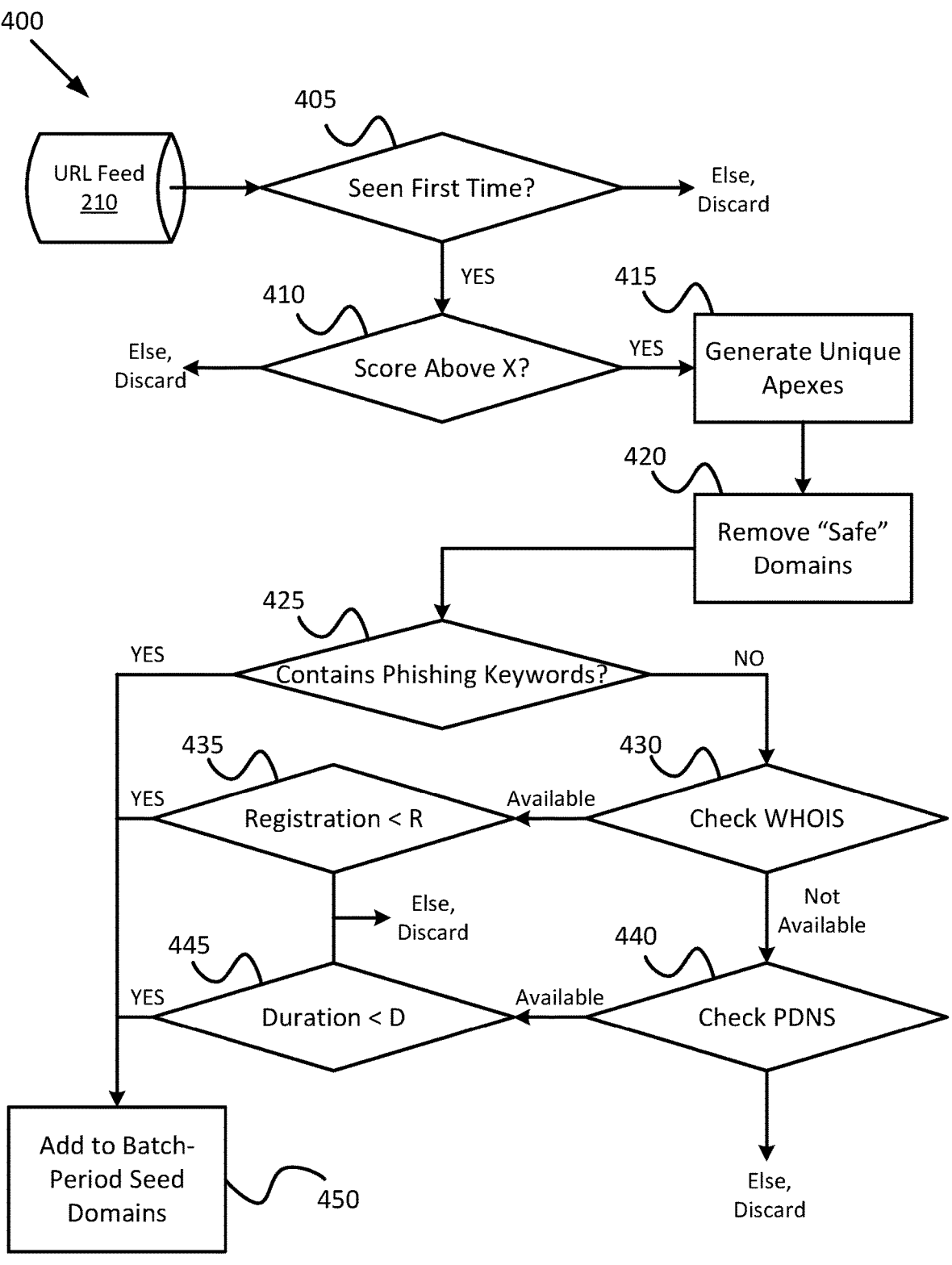
FIG. 4 is a flowchart of a method for generating likely malicious seed domains for a batch period, according to embodiments of the present disclosure.

FIG. 4 is a flowchart of a method 400 for generating likely malicious seed domains for a batch period, according to embodiments of the present disclosure. Aside from being used to initiate the expansion process, a subset of these domains is also included in the malicious ground truth. This subset includes highly likely attack domains (e.g., having reported consensus intelligence feed≥threshold X) from seed malicious domains, and is discussed in with respect to method 500 from FIG. 5. In various embodiments, the batch-period is daily, but other periods of time are also contemplated that are longer or shorter than one day.

At block 405, the security system 160 selects the URLs seen for the first time in the URL feed 210 (e.g., from VT) within the past batch period (e.g., 24 hours). The URL feed 210 contains all the URLs queried by users all over the world, and because the goal of the security system 160 is to preemptively identify the latest malicious domains, these newly seen domains are given priority for further analysis. URLs that have been seen previously may be discarded or ignored in further operations of method 400.

At block 410, the security system 160 selects those URLs identified in block 405 that have been marked as malicious (or potentially malicious) by at least X consensus scanners. URLs identified as malicious by fewer than X consensus scanners may be discarded or ignored in further operations of method 400.

At block 415, the security system 160 extracts the apex domains from the URLs identified as malicious by at least X consensus scanners in block 410. Even though a URL may be marked as malicious, the apex domain of that URL is not necessarily malicious, which is the case with compromised domains.

At block 420, the security system removes domains identified as "safe" or likely benign based on additional heuristics. For example, Based on the webhosting list identified, the security system 160 can exclude likely compromised domains by removing those present in a popularity feed (e.g., the ALEXA top 30-day list). The security system 160 can also exclude apexes belonging to web hosting services such as 000webhostapp.com, github.io, and godaddysites.com, as these hosting services exhibit benign behavior.

In some embodiments, the security system 160 uses a long short-term memory (LSTM) based model to identify Domain Generation Algorithm (DGA) domains and filter those URLs out as generally not of concern, even if not benign. Usually, DGA domains are created in thousands and hosted on a limited set of IP addresses. Such malicious domains are quite different from other attack domains and having such domains included in the analysis set reduces the detection efficacy of non-DGA malicious domains. Hence, to detect attack domains with a high efficacy, the security system 160 excludes DGA domains.

At block 425, the security system 160 identifies URLs with phishing keywords, such as popular brand impersonating keywords that are more likely to be malicious. For example, intentional misspellings of a popular brand or URLs that contain a name of a legitimate website in an otherwise unrelated URL. One of skill in the art will be familiar with methods for identifying phishing keyword and what qualifies as "similar" to a brand name. The security system 160 adds these identified URLs to the batch period seed domain in block 450, and for those likely attack domains that do not have popular brand or phishing keywords, the security system 160 performs additional filtering.

At block 430 and block 440, the security system checks the WHOIS data, PDNS data, or other registration data of the suspected URL. Recently registered and short-lived domains are more likely to be attack domains. To this end, the security system 160 identifies those domains that are registered within a threshold time R (e.g., one year) of the day method 400 is executed, and adds the newly registered domains to the batch period seed domain in block 450. If the WHOIS record is not available (per block 430), the security system 160 checks the PDNS records (per block 440) to obtain its footprint. If the PDNS record is available and the footprint duration is less than a threshold time D (e.g., one year), the security system 160 adds the newly registered domains to the batch period seed domain in block 450. If the PDNS records are not available other heuristics may be applied. Otherwise, if the PDSN record are not available (and no other filtering heuristics are applied) or the length of registration or footprint is greater than R or D, the security system 160 may discard or ignore that URL.

Figure 5:
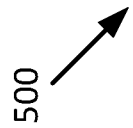
FIG. 5 is a flowchart of a method for malicious ground truth generation, according to embodiments of the present disclosure.

FIG. 5 is a flowchart of a method 500 for malicious ground truth generation, according to embodiments of the present disclosure. In addition to the output of the seed selection pipeline (e.g., per method 400 discussed in relation to FIG. 4), the security system 160 at block also actively queries a sample set of newly observed domains (e.g., a randomly or otherwise selected subset thereof) to enrich and diversify the batch-period list of malicious domains. In both cases, the security system 160 may use one of the most conservative thresholds of X positive consensus scanners to construct the malicious ground truth. Also, based on the observation that attack domains are short-lived, the security system 160 selects the domains that are registered within a threshold time (e.g., within the last year).

At block 510, the security system 160 selects a random set of newly seen domains on a given day.

At block 520, the security system 160 performs an active consensus score lookup to identify whether at least X consensus scanners have identified the domain as malicious. If fewer than X consensus scanners have identified the domain an malicious, the security system 160 may discard or ignore that domain for the rest of method 500.

At block 530, the security system 160 checks the WHOIS or other registration data for the domain. If the domain is new (e.g., registered or tracked for less than R or D days), or registration data are unavailable, the security system 160 labels the domain as malicious as part of the batch-period seed domains 550. Otherwise, the security system 160 may discard or ignore that domain for the rest of method 500.

Figure 6:
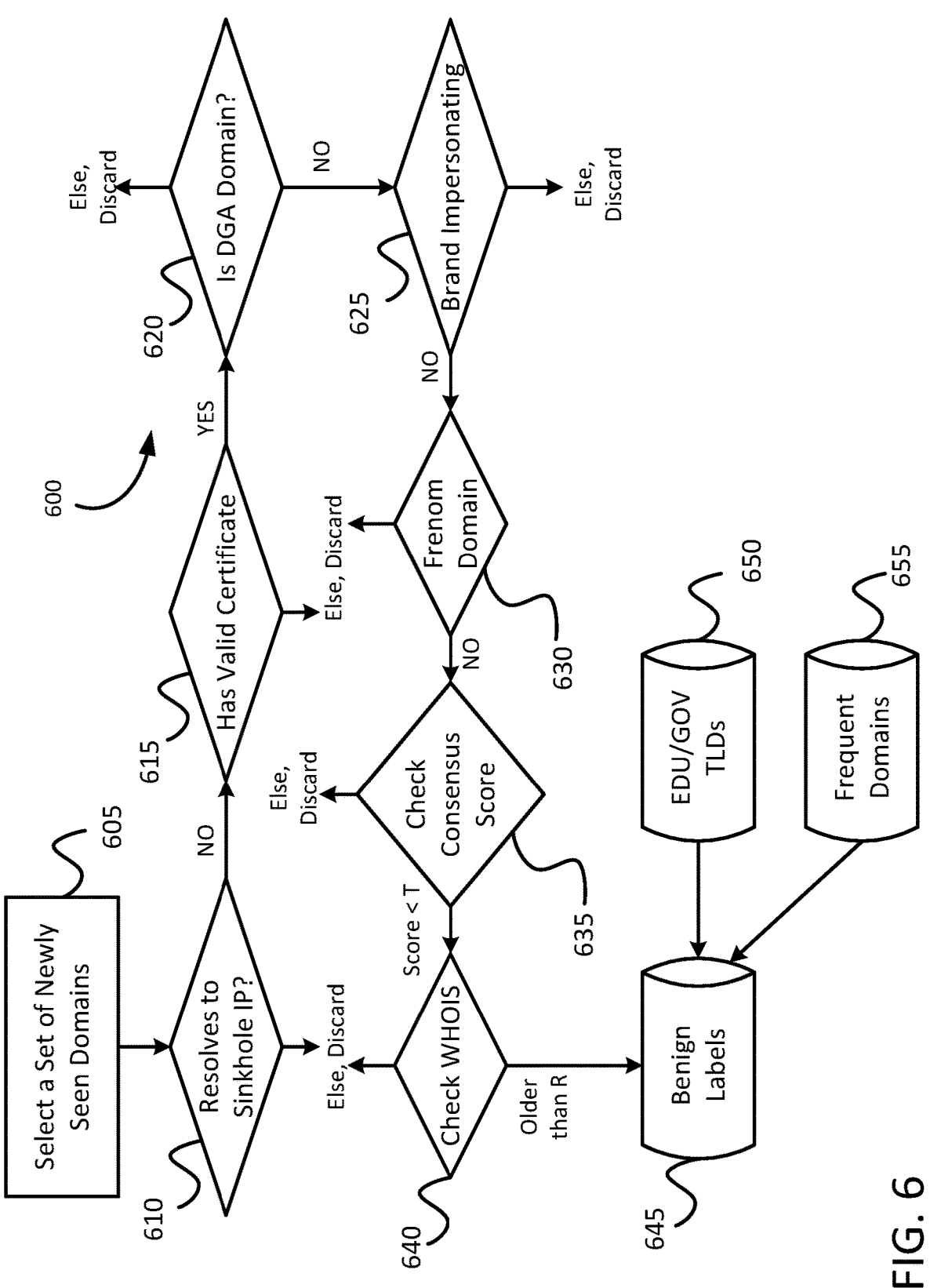
FIG. 6 is a flowchart of an example method to generate the batch-period benign domain ground truth, according to embodiments of the present disclosure.

FIG. 6 is a flowchart of an example method 600 to generate the batch-period benign domain ground truth, according to embodiments of the present disclosure.

At block 605, the security system 160 selects a set of newly seen domains for the batch period (e.g., a given day) from the consensus feed. Focusing on newly seen domains reduces the bias in the benign ground truth, as popularity feeds usually contain popular long-established domains.

At block 610, the security system 160 filters out those domains which resolve into a known list of sinkhole IP addresses. The rationale is that sinkholed domains are known to be malicious.

At block 615, the security system 160 filters out those domains that have invalid or expired certificates. A benign domain is likely to have a valid unexpired certificate, whereas malicious domains are likely to be used for a short time and hence attackers have little/no incentives to re-new their certificates.

At block 620, the security system 160 filters DGA domains identified by the LSTM-based DGA detection tool, because benign domains more likely to have proper names in a natural human language (e.g., English, Arabic, Chinese).

At block 625, the security system 160 filters out domains impersonating popular brand names, because benign domains are less likely to imitate popular brands. In various embodiments, other phishing heuristics can be used in block 625 to filter out domains attempting to impersonate other domains.

At block 630, the security system 160 excludes the TLDs managed by Freenom—.gq, .ml, .cf, .ga, and .tk—because these TLDs have a very low reputation in general and hence are less likely to be benign. Other TLDs associated with various security policies or known to host malicious domains by a third part may also be excluded per block 630.

At block 635, for the remaining domains, the security system 160 performs an active consensus score lookup and extracts those domains which are flagged as benign by all the consensus scanners (e.g., VT=0).

At block 640, the security system 160 performs another filtering because a consensus score of zero does not necessarily indicate that the domain is benign. Accordingly, the security system 160 filters those domains that are registered within a threshold R (e.g., one year) from the classification date as new domains are less likely to be benign. The remaining domains are then labeled as benign per block 645.

In addition to the benign domains identified through active lookup from block 605-640, the security system 160 passively collects the .edu and .gov domains as well as popularity feed domains (e.g., ALEXA top 30-day domains) as benign domains per block 645. It is to be noted that when one utilizes only popularity feed domains as the benign data source, it can be observed that the model does not generalize to unseen data, and results in a high false positive rate.

FIG. 7 illustrates an example of a graph 700, as may be used to proactively detect malicious domains, according to embodiments of the present disclosure.

As described herein, the security system 160 constructs the seed domain list from a consensus feed (e.g., VirusTotal URL feed). Then, using the PDNS database, the security system 160 expands the seed domain list by identifying the hosting IPs, and then other domains recently hosted on those Ips, and finally the hosting IPs of these new domains. It is important to build an appropriate-sized graph 700 in terms of classification performance (e.g., F1-score) and computational cost in order to run the model in practice.

The security system 160 uses the domain and IP features listed in Table 1. In addition to these features, the security system 160 may use various domain lexical features known to those of skill in the art. An issue in the feature engineering phase is that some domain and IP nodes fail to capture any hosting features because the PDNS database has not recorded any resolutions for those domains or IPs. This lack of recordation could occur due to the security system using a shorter window (e.g., of seven days) to extract features and PDNS do not have any records in that window. It is to be noted that existing feature imputation techniques do not apply to these missing features as all related features are missing. Hence, the security system 160 uses a new feature imputation technique leveraging the graph structure. This this technique, the security system 160 takes the five nearest neighbors from the node's neighborhood, and takes the average of the neighbor's features as the node's features. The intuition is that nodes closer to one another tend to have similar characteristics. The more IPs that the two domains are co-hosted at, the more likely there exist strong associations between those domains. The same intuition is also applied to discover the strong association between two IPs if those IPs host many common domains.

The heterogeneous graph 700 shown in FIG. 7 consists of domains 710*a-c* (both apexes 730 and fully qualified domain names (FQDNs)), IPs 720*a-c*, subnets 740, and ASNs 750. Domains nodes 710 have subdomain relationships within each other and are connected to IP nodes 720 that the domains resolve to .IP nodes 720 are connected to Class C subnet nodes 740 and these subnet nodes 740 are connected to respective ASN nodes 750.

The security system 160 performs the following graph pruning to reduce the noise in the graph. While such pruning improves the classification performance of the model, the reduction of the number of nodes in the graph due to pruning is generally quite low.

Because public domains reduce the strength of the homophily relationship, the security system 160 prunes all public domains based on a public list.

The security system 160 removes connected components that contain only a single domain. Because the expansion process starts from the malicious seed domains, these connected components contain a single likely malicious domain. Thus, models might learn to categorize such isolated connected components as malicious, which might negatively impact the generalizability and effectiveness of these models in practice.

The security system 160 assign the features extracted to each node and injects the benign and malicious labels generated per method 500 and method 600. Using N-fold (e.g., five-fold) cross-validation, the security system 160 trains a semi-supervised GraphSAGE model with L (e.g., three) layers.

Figure 8:
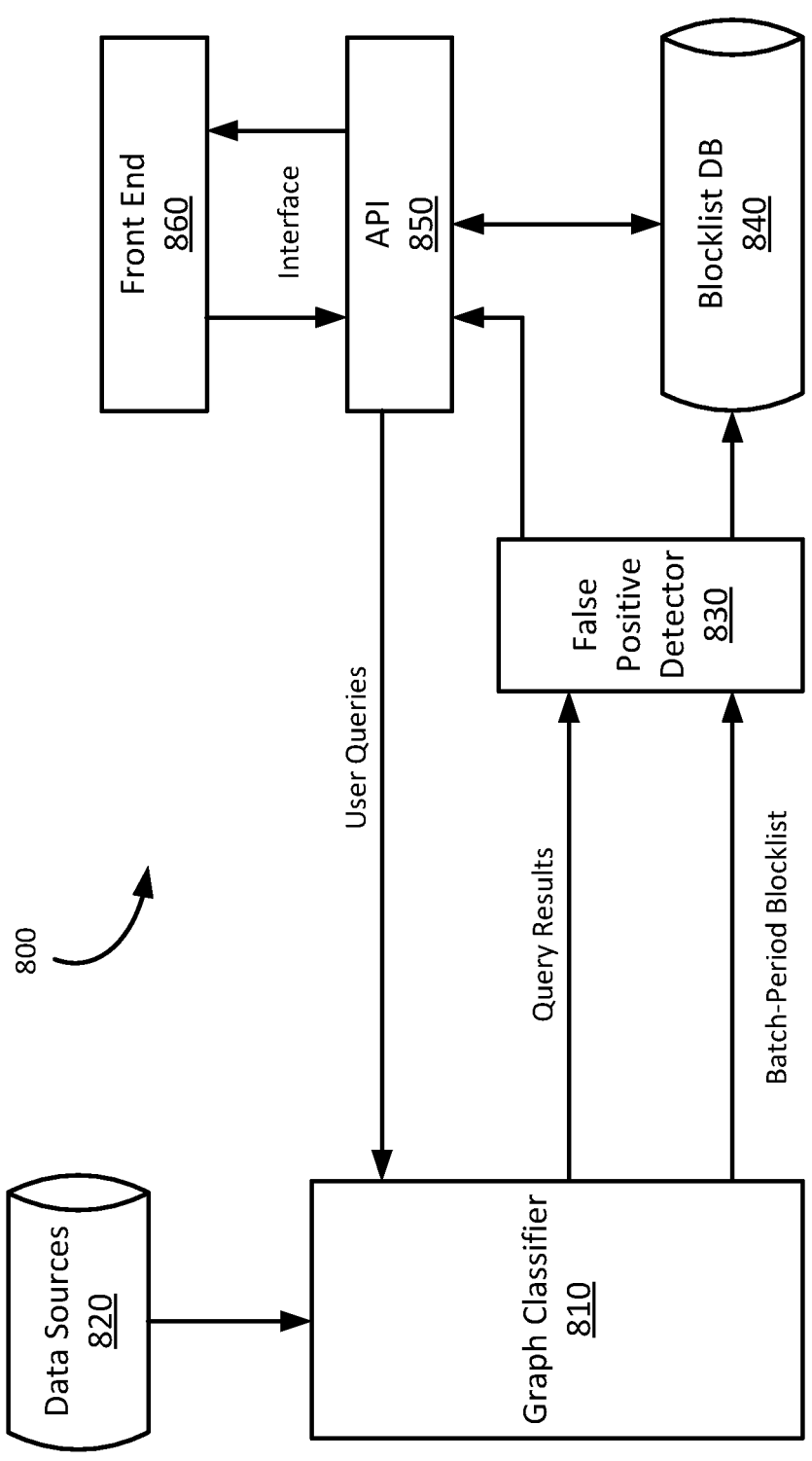
FIG. 8 illustrates an architecture of the security system operating as a real-time classifier and batch list generator, according to embodiments of the present disclosure.

During the testing phase, the security system 160 takes the labeled domains observed on the following batch period to the training window. For example, if the model is trained on the July 1-7, 2022 window, and the batch period is one day, the testing data are collected starting on Jul. 8, 2022. In order to avoid leakage, the security system 160 ensures that the testing domains do not appear in the training labels. Accordingly, the security system 160 builds a testing graph around these testing domains similar to how the security system builds the training graph and append the testing graph to the training graph before performing the forward pass FIG. 8 illustrates an architecture 800 of the security system 160 operating as a real-time classifier and batch list generator, according to embodiments of the present disclosure. The goal of the security system 160 as a real-time classifier is to assess the maliciousness of any domain in the world. Thus, the aim of the real-time classifier includes further functionality beyond blocklist generation. In blocklist generation, the seed nodes are known to be highly likely to be malicious, and within the computation graph of each node there exists at least one malicious node. By learning the behavior of these malicious nodes, the security system 160 infers unseen malicious domains. However, for a real-time classifier, relying on only one graph could result in high false positives as the domain being classified may have a different distribution than those in the training dataset. One way to reduce this distribution gap is to consider training data from multiple time periods so that the training data is likely to capture the distribution of domains in the wild. Thus, the security system 160 operates for the real-time classification differently than the block-list generator of the security system 160.

As stated throughout the present disclosure, the security system 160 can operates in two modes: 1) Batch mode to generate blocklists and 2) Real-time mode to predict the maliciousness of unseen domains.

The security system 160 generates a batch-period (e.g., daily) blocklist based on the newly observed seed malicious domains gathered from a consensus feed every batch period and other data sources 820 via the graph classifier 810, which may operate according to methods 200, 300, 400, 500, and 600 as discussed herein.

Before storing batch period predictions in the blocklist database 840, the security system 160 further filters out the likely false positive domains. The false positive detector 830 executes various filtering rules, which include: domains that appear in a popular domain list/feed (e.g., the ALEXA Top 1 million 7-day list), domains registered for more that R time (e.g., more than 2 years), etc.

As shown in FIG. 8, users may access the security system 160 either using the front end 860 by using login credentials or through the API 850 using API keys. Both front end 860 the API 850 provide access to the generated blocklists database 840 and enable user queries. User may submit queries and receive responses via either interface to ascertain whether the security system 160 classifies an individual domain (or a collection of domains) as malicious or benign. Such queries may be used in addition to or instead of using a blocklist to protect users from malicious parties. Accordingly, the security system 160 provides users with the multiple options to detect and avoid accessing potentially malicious domains without having the analyze the content offered by those domains, upstream in the delivery infrastructure pipeline from eventual delivery or analysis of malicious content.

For the real-time classifier, the security system 160 uses semi-supervised inductive models trained for blocklist generation to gather data from the various data sources 820. Instead of using the resulting confidence scores, the security system 160 collects the embeddings from the last GNN layers, and trains a meta-learner with these embeddings. Thus, the data for the real-time classifier are the same as for the block-list classifier, except that a longer training window is considered in some embodiments.

The real-time classifier uses the malicious and benign ground truth from batch period collections. The real-time classifier combines the validation sets of the various trained models for the time windows (e.g., weekly training) with the following time period's (e.g., month's) ground truth, which is not part of the training graphs. For example, the security system 160 can use the weekly models for July, and select the benign and malicious seeds from the following August that are not part of these training graphs as the ground truth data for the meta-learner. In this way, the real-time classifier is expected to perform and adapt well to the rapidly evolving environment.

In model training for the real-time classifier, it has been identified that semi-supervised graph learning followed by supervised classification yields more favorable results compared to the models used for blocklist generation. Further, instead of using the training data for a longer period (e.g. one month vs. one week) to train a single model, having multiple models for different time slices and ensembling those models yields superior results (see FIG. 3). In various embodiments, four GNN encoders are ensembled in the model stack, although other numbers of GNN encoders are contemplated. In various embodiments, a Random Forest algorithm is sued by the meta-learner classifier, although other algorithms are contemplated.

For training, the security system 160 performs the same passive DNS expansion on the collected ground truth as for batch-period analysis, and combines the ground truths with the n training graphs corresponding to the n GNN models, which yields n embeddings for each domain that are then concatenated. The concatenated encoding is fed to the downstream meta-learner to classify each domain as benign or malicious.

By leveraging the observation that attackers reuse hosting infrastructures to host disposable domains to detect malicious domains based on a small set of known malicious domains, the security system 160 is able to detect malicious domains before content analysis needs to be performed; thereby drastically speeding up detection relative to traditional methods and reducing the potential harm inflicted by these malicious domains.

The ability to use a trained model for a certain time period without re-training provides several practical benefits including reduced training-time, better resource usage, and lower labeling cost.

According to an embodiment of the present disclosure, the method for predicting malicious domains in a neighborhood of seed malicious domains using a semi-supervised graph neural network includes constructing a semi-supervised graph neural network, and training the semi-supervised graph neural network using five-fold cross-validation.

In the first operation, a semi-supervised graph neural network is constructed. In various embodiments, the semi-supervised graph neural network is constructed using DNS resolutions. Further the semi-supervised graph neural network consists of apex domains, FQDN domains, IPs, subnets, and ASNs. The specified domains have subdomain relationships within each other and are connected to IP nodes. In turn, the IP nodes are connected to Class C subnets, which are connected to respective ASNs. In some embodiments, the graph construction includes a pruning process to reduce the noise in the graph. While such pruning improves the classification performance of the model, the reduction of the number of nodes in the graph due to pruning is low.

In the second operation, the semi-supervised graph neural network is trained. In a number of embodiments, benign and malicious labels are collected and injected into the graph. Then, using five-fold cross-validation, a semi-supervised GraphSAGE model with 3 layers having the embedding dimensions of 48 is trained. In an example, a learning rate of 0.01 on a 32-core machine with Tesla V100 GPU cores is used.

Figure 9:
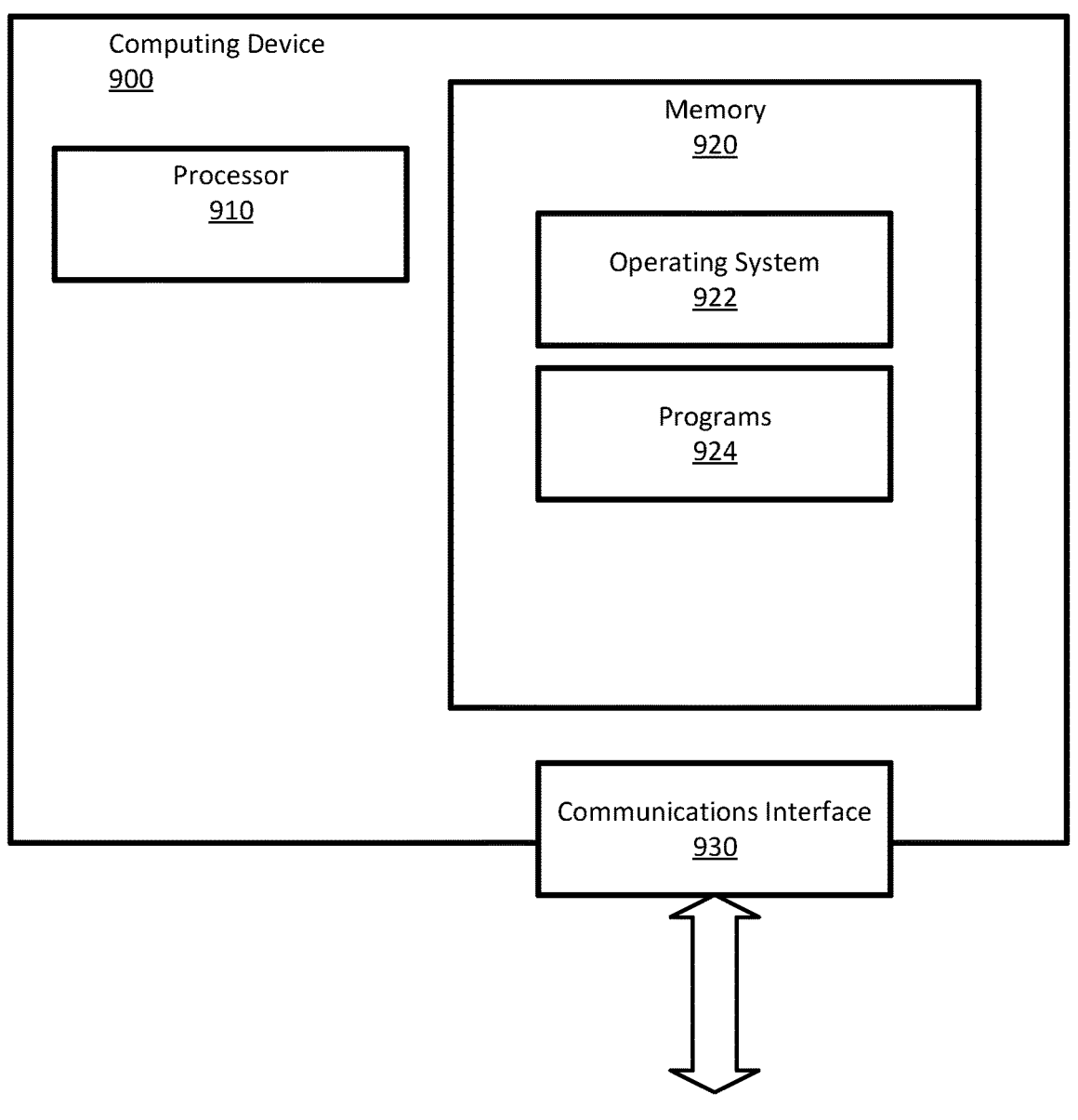
FIG. 9 illustrates a computing device, according to embodiments of the present disclosure.

FIG. 9 illustrates a computing device 900, as may be used in proactively detecting malicious domains using graph representation learning, according to embodiments of the present disclosure. The computing device 900 may include at least one processor 910, a memory 920, and a communication interface 930.

The processor 910 may be any processing unit capable of performing the operations and procedures described in the present disclosure. In various embodiments, the processor

910 can represent a single processor, multiple processors, a processor with multiple cores, and combinations thereof.

The memory 920 is an apparatus that may be either volatile or non-volatile memory and may include RAM, flash, cache, disk drives, and other computer readable memory storage devices. Although shown as a single entity, the memory 920 may be divided into different memory storage elements such as RAM and one or more hard disk drives. As used herein, the memory 920 is an example of a device that includes computer-readable storage media, and is not to be interpreted as transmission media or signals per se.

As shown, the memory 920 includes various instructions that are executable by the processor 910 to provide an operating system 922 to manage various features of the computing device 900 and one or more programs 924 to provide various functionalities to users of the computing device 900, which include one or more of the features and functionalities described in the present disclosure. One of ordinary skill in the relevant art will recognize that different approaches can be taken in selecting or designing a program 924 to perform the operations described herein, including choice of programming language, the operating system 922 used by the computing device 900, and the architecture of the processor 910 and memory 920. Accordingly, the person of ordinary skill in the relevant art will be able to select or design an appropriate program 924 based on the details provided in the present disclosure.

The communication interface 930 facilitates communications between the computing device 900 and other devices, which may also be computing devices as described in relation to FIG. 9. In various embodiments, the communication interface 930 includes antennas for wireless communications and various wired communication ports. The computing device 900 may also include or be in communication, via the communication interface 930, one or more input devices (e.g., a keyboard, mouse, pen, touch input device, etc.) and one or more output devices (e.g., a display, speakers, a printer, etc.).

Although not explicitly shown in FIG. 9, it should be recognized that the computing device 900 may be connected to one or more public and/or private networks via appropriate network connections via the communication interface 930. It will also be recognized that software instructions may also be loaded into a non-transitory computer readable medium, such as the memory 920, from an appropriate storage medium or via wired or wireless means.

Accordingly, the computing device 900 is an example of a system that includes a processor 910 and a memory 920 that includes instructions that (when executed by the processor 910) perform various embodiments of the present disclosure. Similarly, the memory 920 is an apparatus that includes instructions that, when executed by a processor 910, perform various embodiments of the present disclosure.

Certain terms are used throughout the description and claims to refer to particular features or components. As one skilled in the art will appreciate, different persons may refer to the same feature or component by different names. This document does not intend to distinguish between components or features that differ in name but not function.

As used herein, the term "optimize" and variations thereof, is used in a sense understood by data scientists to refer to actions taken for continual improvement of a system relative to a goal. An optimized value will be understood to represent "near-best" value for a given reward framework, which may oscillate around a local maximum or a global maximum for a "best" value or set of values, which may change as the goal changes or as input conditions change. Accordingly, an optimal solution for a first goal at a given time may be suboptimal for a second goal at that time or suboptimal for the first goal at a later time.

As used herein, "about," "approximately" and "substantially" are understood to refer to numbers in a range of the referenced number, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole numbers, or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in the present disclosure, a phrase referring to "at least one of" a list of items refers to any set of those items, including sets with a single member, and every potential combination thereof. For example, when referencing "at least one of A, B, or C" or "at least one of A, B, and C", the phrase is intended to cover the sets of: A, B, C, A-B, B-C, and A-B-C, where the sets may include one or multiple instances of a given member (e.g., A-A, A-A-A, A-A-B, A-A-B-B-C-C-C, etc.) and any ordering thereof. For avoidance of doubt, the phrase "at least one of A, B, and C" shall not be interpreted to mean "at least one of A, at least one of B, and at least one of C".

As used in the present disclosure, the term "determining" encompasses a variety of actions that may include calculating, computing, processing, deriving, investigating, looking up (e.g., via a table, database, or other data structure), ascertaining, receiving (e.g., receiving information), accessing (e.g., accessing data in a memory), retrieving, resolving, selecting, choosing, establishing, and the like.

Without further elaboration, it is believed that one skilled in the art can use the preceding description to use the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

Within the claims, reference to an element in the singular is not intended to mean "one and only one" unless specifically stated as such, but rather as "one or more" or "at least one". Unless specifically stated otherwise, the term "some" refers to one or more. No claim element is to be construed under the provision of 35 U.S.C. § 112(f) unless the element is expressly recited using the phrase "means for" or "step for". All structural and functional equivalents to the elements of the various embodiments described in the present disclosure that are known or come later to be known to those of ordinary skill in the relevant art are expressly incorporated herein by reference and are intended to be encompassed by the claims. Moreover, nothing disclosed in the present disclosure is intended to be dedicated to the public regardless of whether such disclosure is explicitly recited in the claims.

What is claimed is:

1. A method, comprising:

extracting seed domains from a uniform resource locator (URL) feed of observed requests for access to domains;

expanding the seed domains via a passive domain name service crawl to include additional domains with the seed domains;

collecting a ground truth, including labeling a first set of the seed domains as benign and a second set of the seed domains as malicious;

constructing a graph neural network (GNN) of the additional domains and the seed domains, wherein each domain of the additional domains and the seed domains is represented as a node in the GNN that includes feature values associated with that domain;

training the GNN to classify unseen domains not associated with a node as either benign or malicious; and classifying, via the GNN, a queried domain as either benign or malicious.

2. The method of claim 1, wherein constructing the GNN includes:

assembling an ensemble of GNN encoders in a model stack; and combining outputs of the ensemble of GNN encoders via a metalearner.

3. The method of claim 1, wherein labeling the first set of the seed domains as benign includes:

selecting the first set from the URL feed as domains that have not been seen before;

excluding domains that resolve to sinkhole Internet Protocol addresses;

excluding domains that do not have a valid certificate;

excluding domains that have URLs identified as being created via a domain generation algorithm;

excluding domains identified as impersonating a brand name;

excluding domains associated with a top level domain associated with hosting malicious domains by a third party analysis;

excluding domains that have a consensus score assigned by a plurality of consensus sensors in a consensus feed above a consensus threshold;

excluding domains that have been registered from less time than a registration threshold;

adding domains having .gov and .edu TLDs; and adding domains belonging to a popularity feed.

4. The method of claim 1, wherein labeling the second set of the seed domains as malicious includes:

selecting the second set from the URL feed as domains that have not been seen before;

excluding domains that have a consensus score assigned by a plurality of consensus sensors in a consensus feed below a consensus threshold;

excluding domains that have been registered from more time than a registration threshold; and adding the seed domains.

5. The method of claim 1, wherein classifying the queried domain creates a blocklist of several domains classified as malicious from the URL feed and one or more domains not seen in the URL feed that are proactively identified as malicious based on a relationship with domains identified as malicious by the GNN.

6. The method of claim 1, wherein classifying the queried domain returns a real-time response that identifies the queried domain as either benign or malicious.

7. The method of claim 1, wherein the queried domain is classified as benign or malicious at hosting infrastructure upstream of content delivery without analyzing content hosted by the queried domain.

8. A system, comprising a processor and a memory including instructions that when executed by the processor, perform operations including:

extracting seed domains from a uniform resource locator (URL) feed of observed requests for access to domains;

expanding the seed domains via a passive domain name service crawl to include additional domains with the seed domains;

collecting a ground truth, including labeling a first set of the seed domains as benign and a second set of the seed domains as malicious;

constructing a graph neural network (GNN) of the additional domains and the seed domains, wherein each domain of the additional domains and the seed domains is represented as a node in the GNN that includes feature values associated with that domain;

training the GNN to classify unseen domains not associated with a node as either benign or malicious; and classifying, via the GNN, a queried domain as either benign or malicious.

9. The system of claim 8, wherein constructing the GNN includes:

assembling an ensemble of GNN encoders in a model stack; and combining outputs of the ensemble of GNN encoders via a metalearner.

10. The system of claim 8, wherein labeling the first set of the seed domains as benign includes:

selecting the first set from the URL feed as domains that have not been seen before;

excluding domains that resolve to sinkhole Internet Protocol addresses;

excluding domains that do not have a valid certificate;

excluding domains that have URLs identified as being created via a domain generation algorithm;

excluding domains identified as impersonating a brand name;

excluding domains associated with a top level domain associated with hosting malicious domains by a third party analysis;

excluding domains that have a consensus score assigned by a plurality of consensus sensors in a consensus feed above a consensus threshold;

excluding domains that have been registered from less time than a registration threshold;

adding domains having .gov and .edu TLDs; and adding domains belonging to a popularity feed.

11. The system of claim 8, wherein labeling the second set of the seed domains as malicious includes:

selecting the second set from the URL feed as domains that have not been seen before;

excluding domains that have a consensus score assigned by a plurality of consensus sensors in a consensus feed below a consensus threshold;

excluding domains that have been registered from more time than a registration threshold; and adding the seed domains.

12. The system of claim 8, wherein classifying the queried domain creates a blocklist of several domains classified as malicious from the URL feed and one or more domains not seen in the URL feed that are proactively identified as malicious based on a relationship with domains identified as malicious by the GNN.

13. The system of claim 8, wherein classifying the queried domain returns a real-time response that identifies the queried domain as either benign or malicious.

14. The system of claim 8, wherein the queried domain is classified as benign or malicious at hosting infrastructure upstream of content delivery without analyzing content hosted by the queried domain.

15. A memory including instructions, that when executed by a processor, perform operations including:

extracting seed domains from a uniform resource locator (URL) feed of observed requests for access to domains;

expanding the seed domains via a passive domain name service crawl to include additional domains with the seed domains;

collecting a ground truth, including labeling a first set of the seed domains as benign and a second set of the seed domains as malicious;

constructing a graph neural network (GNN) of the additional domains and the seed domains, wherein each domain of the additional domains and the seed domains is represented as a node in the GNN that includes feature values associated with that domain;

training the GNN to classify unseen domains not associated with a node as either benign or malicious; and classifying, via the GNN, a queried domain as either benign or malicious.

16. The memory of claim 15, wherein constructing the GNN includes:

assembling an ensemble of GNN encoders in a model stack; and combining outputs of the ensemble of GNN encoders via a metalearner.

17. The memory of claim 15, wherein labeling the first set of the seed domains as benign includes:

selecting the first set from the URL feed as domains that have not been seen before;

excluding domains that resolve to sinkhole Internet Protocol addresses;

excluding domains that do not have a valid certificate;

excluding domains that have URLs identified as being created via a domain generation algorithm;

excluding domains identified as impersonating a brand name;

excluding domains associated with a top level domain associated with hosting malicious domains by a third party analysis;

excluding domains that have a consensus score assigned by a plurality of consensus sensors in a consensus feed above a consensus threshold;

excluding domains that have been registered from less time than a registration threshold;

adding domains having .gov and .edu TLDs; and adding domains belonging to a popularity feed.

18. The memory of claim 15, wherein labeling the second set of the seed domains as malicious includes:

selecting the second set from the URL feed as domains that have not been seen before;

excluding domains that have a consensus score assigned by a plurality of consensus sensors in a consensus feed below a consensus threshold;

excluding domains that have been registered from more time than a registration threshold; and adding the seed domains.

19. The memory of claim 15, wherein classifying the queried domain creates a blocklist of several domains classified as malicious from the URL feed and one or more domains not seen in the URL feed that are proactively identified as malicious based on a relationship with domains identified as malicious by the GNN.

20. The memory of claim 15, wherein classifying the queried domain returns a real-time response that identifies the queried domain as either benign or malicious.

* * * * *